Patented May 10, 1932

1,858,203

UNITED STATES PATENT OFFICE

AUGUSTUS H. FISKE, OF WARREN, AND CHARLES S. BRYAN, OF EAST PROVIDENCE, RHODE ISLAND, ASSIGNORS TO RUMFORD CHEMICAL WORKS, OF RUMFORD, RHODE ISLAND, A CORPORATION OF RHODE ISLAND

PURIFICATION OF PHOSPHORIC ACID

No Drawing. Application filed January 13, 1931. Serial No. 508,549.

In the manufacture of phosphoric acid there has been a persistent problem in the included fluorine resultants. These are very definite in the production of phosphoric acid and probably are developed in other manufactures from natural sources where the earthy material carries fluoridic impurities.

The problem of their elimination has been successfully attacked first by Ross (as in his Patent No. 1,329,273) and later developed by Carothers (in his Patent No. 1,487,205). These men have contributed largely to the solution of the problem, but in commercial operation there remained the ultimate determination of a basis of practical production for those articles of human consumption which must be produced in a pure state at a cost within the consumer's ability to enjoy.

Ross' original concept was based on the insolubility of sodium fluoridic compounds in a concentrated solution of phosphoric acid. It suggests perfectly successful results in processing materials from original sources in which there was sufficient silicon to combine with the fluorine and when the chemical reactants were mixed the fluorine was liberated in the proper form to combine completely with the silicon contained in the original materials. The result then necessarily involved the formation of a silicon tetra fluoride as the preliminary step to the precipitation of his sodium fluoridic compounds.

The work of Carothers and Gerber as disclosed in their patent above referred to in which they make specific references to Ross' patent, apparently involved sources which were too low in silicon to give complete conversion of the fluorine or involved processes which prevented such complete conversion. To that end they proposed to precipitate the fluorine with sodium silicate which they believed removed the fluorine more efficiently than the chloride, carbonate, phosphate or hydroxide mentioned by Ross. In fact, they seemed to have been convinced that the combination of silicon and sodium as in waterglass, was necessary to cause a precipitate while if used separately only a slight fluorine reduction was observed by them and no reduction whatever with silica. That is to say, they contemplated the formation of a direct combination between the water-glass and the fluorine as distinguished from Ross who formed a fluoride ignoring the silicon which undoubtedly was present in the original raw phosphate material. We have found that silica is important and effective but with certain limitations, as will be later discussed. Such may account for the difficulties of Carothers and Gerber and may explain whatever success was attained by Ross even though he had no concept of the possibilities of silica if used definitely and of definite characteristic.

This is in sharp contra-distinction from the teaching of Carothers and Gerber who believed that no reduction took place with silica alone, but that it was necessary to have a silicate.

On the basis of our concept, i. e. of utilizing the silica to form silicon tetra fluoride as our definite intermediate step, we are able to produce a complete precipitation of the fluorine by silica but in this we have discovered a line of demarcation most important for practical results. While sand or ground quartz may, and sometimes does provide for the desired reaction, such reaction is slow and in commercial practice is not at all satisfactory or feasible. In our work with various sources of silicon we discovered what is believed to be a new basis for successful commercial operation. This provides a new concept for such operations in which by readily available sources the time for the reaction is very much reduced, and the efficiency very much increased. The basis of this concept is the discovery that silica in a hydrated form provides just that differentiation in efficiency as to make it distinctive.

It is to be noted that hydrated silicas are included among the considerable list of commercially available sources of silica, and in fact, in certain form are readily and economically available in most places for commercial production. We have found that these hydrated silicas react in the instances herein involved with an unexpected efficiency and with great rapidity. The exact theory of such reactions is difficult to formulate with certainty, but the results are so definite as to leave no doubt that any hydrated form of silica not contaminated by unfavorable diluents may be used to great advantage.

It is to be noted that under mineralogical classification the hydrated silicas fall under the general mineralogical classification of opals, of which Dana in his system of mineralogy (6th edition) cites twenty-one as occurring in nature. There are in addition to these natural hydrated silicas, various artificial products, such as by-products of manufacture. Among these may be noted those resulting from the production of aluminum from clay, from the manufacture of fertilizers, from the bleaching of micas, production of aluminum sulphate from Bauxite, and various other chemical residues containing hydrated silica of similar characteristics.

Our concept of the reactions which take place in accordance with our invention is, for example,

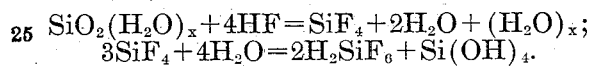

The HF referred to in the above reaction is obtained in the solution of phosphoric acid, when in the process of its manufacture calcium phosphate containing calcium fluoride is treated with sulphuric acid. The reactions involved in this process of manufacture may be indicated as follows:

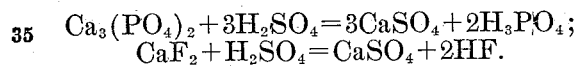

The resultant acid solution contains a mixture of $H_3PO_4$ and HF, i. e. phosphoric acid and the hydroflouric acid.

We further note that Carothers and Gerber state that fluorine is removed during the concentration of the dilute acid produced by treating bone black or phosphate rock with sulphuric acid. With this we disagree as appears above in our discussion of the reactions which we believe to take place in accordance with our invention. That is to say, a portion may be boiled off but we find in such process a considerable amount, i. e. 1% to 2% of fluorine persisting in the concentrated acid and thereby necessitating the definite quantitative addition of silicon to supplement the usual deficit of this element which only accidentally occurs in the raw material.

The problem is a practical one and involves sources of reactants which in turn involve new methods of treatment under which they may be sucessfully used. In our concept we have noted particularly the reactive phase of silicon tetra fluoride which seems to be controlling.

We contemplate a complete development of this phase as necessary to the ultimate precipitation, as heretofore suggested. To effect this we find that a hydrated silica is most effective. Furthermore, we find that natural hydrated silicas are perfectly utilizable. For example, infusorial earths or certain forms of diatomaceous earths which show a definite hydration of the silica may be used. One natural source is tripolite which is classified mineralogically under the class of opals with a chemical formula $SiO_2.nH_2O$. In utilizing such materials we find that it is only necessary to supply heat and agitation to effect the desired reaction which takes place promptly and efficiently.

For example, taking a phosphoric acid of usual concentration as at 60° B. This will contain usually when derived from natural rock about 1% or 2% of fluorine extracted from the raw material in the production of the phosphoric acid as explained above.

We have found that the addition of say 1% of hydrated silica in any of the natural forms referred to or in most of the by-product or synthetic forms suggested in finely divided condition when boiled for a few minutes in the solution with rapid agitation will accomplish the desired conversion of the hydrofluoric acid to silicon tetra fluoride. This in turn is converted to hydrofluosilicic acid. By the addition of 1% more or less of soda ash we have found that on cooling the phosphoric acid solution we obtain the desired complete separation of the sodium silico fluoride.

Without the use of some form of hydrated silica and even with heat and agitation we have been unable to obtain the desired complete and prompt separation of the sodium silico flouride from phosphoric acid from the ordinary sulphuric acid process described above.

After cooling and precipitation, the precipitate of sodium silico fluoride may be removed from the phosphoric acid solution by filtration or any of the ordinary methods known to chemists to accomplish this purpose.

What we therefore claim and desire to secure by Letters Patent is:—

1. In the freeing of phosphoric acid liquors from fluorine, those steps including the boiling of the liquor with hydrated silica and precipitating a salt of hydrofluosilicic acid.

2. In the freeing of phosphoric acid liquors from fluorine, those steps including the boiling of the liquor with a hydrated silica of infusorial origin and precipitating a salt of hydrofluosilicic acid.

In testimony whereof we affix our signatures.

AUGUSTUS H. FISKE.
CHARLES S. BRYAN.